United States Patent [19]

Hiramatsu et al.

[11] Patent Number: 5,700,093
[45] Date of Patent: Dec. 23, 1997

[54] BEARING STRUCTURE

[75] Inventors: Nobutaka Hiramatsu; Mitsuru Sugita; Yoshikazu Mizuno; Takayuki Shibayama, all of Nagoya, Japan

[73] Assignee: Daido Metal Company Ltd., Nagoya, Japan

[21] Appl. No.: 797,245

[22] Filed: Feb. 7, 1997

[30] Foreign Application Priority Data

Feb. 29, 1996 [JP] Japan ................... 8-071268

[51] Int. Cl.$^6$ ............................................. F10C 9/04
[52] U.S. Cl. ........................ 384/276; 384/294; 384/907
[58] Field of Search ...................... 384/276, 294, 384/297, 299, 429, 430, 907, 909, 300, 908, 913

[56] References Cited

U.S. PATENT DOCUMENTS

| 2,776,175 | 1/1957 | Waite | 384/294 |
| 4,562,122 | 12/1985 | Hodes et al. | 384/276 X |
| 4,836,695 | 6/1989 | Baureis et al. | 384/276 |
| 4,847,135 | 7/1989 | Braus et al. | 384/907 X |

FOREIGN PATENT DOCUMENTS

| 4-282013 | 10/1992 | Japan |
| 6-257613 | 9/1994 | Japan |

Primary Examiner—Thomas R. Hannon
Attorney, Agent, or Firm—Browdy and Neimark

[57] ABSTRACT

Disclosed is a bearing structure of a sliding bearing which is held in a housing and which rotatably supports a rotary shaft. At least one of the outer surface of the sliding bearing and the inner surface of the housing is covered with a coating layer which essentially consists of, by weight, a total amount of not more than 90% of solid lubricant and hard particles in which the solid lubricant is of 3 to 50% and the hard particles are of 1 to 50%, and the balance of polyamideimide resin.

5 Claims, 1 Drawing Sheet

BEARING STRUCTURE

BACKGROUND OF THE INVENTION

The present invention relates to a bearing structure of a sliding or plane bearing, more particularly, to the sliding bearing which is mounted in an internal-combustion engine and which receives a dynamic load.

Recently, housings in which the sliding bearings are assembled have a reduced wall thickness or are made of an aluminum alloy in order to make them more light in weight at the sacrifice rigidity thereof. Thus, such housings are liable to have a small cyclic strain due to a dynamic load. For example, while internal-combustion engines have been developed in the view points of raising operational speed and temperature which bring about a higher load in the big end of a connecting rod and main bearing holders for a crank shaft, these portions which hold sliding bearings have been tried to make lighter in weight thereof. Such sliding bearing is liable to be damaged with respect to its outer surface by fretting wear under occurrence of a slight movement with collision and sliding relative to the housing due to the above cyclic strain induced in the housing.

In order to restrain fretting wear of sliding bearings, it has been well known to provide an outer surface of the sliding bearing or an inner surface of a housing which holds the sliding bearing with a coating layer of resin, such as polytetrafluoroethylene (hereinafter referred to as ügPTFE").

JP-A-4-282013 discloses such a coating layer made of epoxy resin in which Mo2S, PTFE and/or graphite are (is) added thereby fretting wear is restrained so that a sliding bearing assembled in a housing can have an excellent durability.

JP-A-6-257613 discloses a sliding bearing covered with a coating layer of PTFE and polyamide-imide or a modified polyamide-imide thereby surely restraining fretting wear of the sliding bearing.

According to the prior art stated above in which the bearing structure consisting of a sliding bearing and a housing which holds the sliding bearing, at least one of the outer surface of the sliding bearing and the inner surface of the housing being provided with a coating layer, the sliding bearing can be improved in fretting wear resistance. However, the inventors found problems that such known coating layer of resin is not fully satisfactory in wear resistance and the bearing structure provided with such coating layer is deteriorated in anti-seizure property of the inner surface of the sliding bearing.

SUMMARY OF THE INVENTION

Thus, it is a primary object of the present invention to provide a sliding bearing structure with utilization of a coating layer of resin which is excellent in wear resistance thereby restraining occurrence of fretting wear.

Another object of the present invention is to improve the sliding bearing structure in anti-seizure property of the inner surface of the sliding bearing.

According to a first aspect of the invention, there is provided a bearing structure of a sliding bearing which is held in a housing and which rotatably supports a rotary shaft, wherein at least one of the outer surface of the sliding bearing and the inner surface of the housing is covered with a coating layer which essentially consists of, by weight, a total amount of not more than 90% of solid lubricant and hard particles in which the solid lubricant is of 3 to 50% and the hard particles are of 1 to 50%, and the balance of polyamide-imide resin.

According to such bearing structure, occurrence of fretting wear therein is well restrained since the coating layer is excellent in wear resistance.

The housing can be made from a various types of material including steel and light metal alloys such as aluminum alloys by means of casting, forging or sintering.

The hard particles can be at least one selected from the group consisting of oxide, nitride, carbide and fluoride. The oxide can be a metal oxide or a composite metal oxide. The solid lubricant can be at least one of polytetrafluoroethylene, molybdenum disulfide (MoS2) and graphite.

According to a second aspect of the invention, there is provided a sliding bearing whose outer surface is covered with a coating layer which essentially consists of, by weight, a total amount of not more than 90% of solid lubricant and hard particles wherein the solid lubricant is of 3 to 50% and the hard particles are of 1 to 50%, and the balance of polyamide-imide resin.

The sliding bearing can be a multi-layer bearing such as a double layer bearing which consists of a backing metal layer and a bearing metal layer formed on the backing metal layer, or a triplicate layer bearing which consists of a backing metal layer, a bearing metal layer formed on the backing metal layer and an overlay on the bearing metal layer. The bearing metal can be an aluminum alloy or a copper alloy.

The backing metal is made from a cold-rolled mild steel plate, preferably a plate of low carbon steel which has good workability, but not limited to it. The backing plate can made from other proper materials as occasion demands.

The coating layer can be provided on at least one of the outer surface of the sliding bearing and the inner surface of the housing.

Polyamide-imide resin (hereinafter referred to as "PAI"), having the following chemical structure, is a polymer, whose backbone chains include alternately arranged amide and imide bonds. The resin comprises a modified polyamide-imide resin.

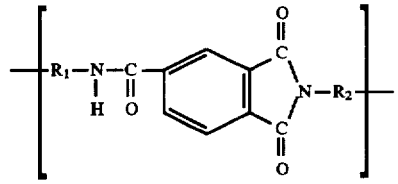

(R: Alkyl group)

The solid lubricant reduces the coefficient of friction of the coating layer. It can be at least one of resin including PTFE, graphite and molybdenum disulfide ($MoS_2$). A coating layer which contains less than 3 wt % of the solid lubricant has not satisfactory lubrication property. On the other hand, a solid lubricant content of more than 50 wt % in a coating layer reduces wear resistance thereof. Considering the sliding properties of the coating layer, it preferably contains 5 to 40 wt % of solid lubricant.

The hard particles enhance the wear resistance of the coating layer, which can be at least one of oxide, nitride, carbide and fluoride. These hard substances in the coating layer restrain anti-seizure property of the bearing surfaces from deteriorating.

The hard particles can be a metal oxide and composite metal oxides. The metal oxide comprises oxides of the following metals: Zn, Al, Sb, Y, In, Zr, Mo, Cd, Ca, Ag, Cr, Co, Ti, Si, Mn, Sn, Ce, W, Bi, Ta, Fe, Cu, Pb, Ni, Te, Nb, Pt, V, Pd, Mg and Li.

The composite metal oxide comprises the following: $CoO-Al_2O_3$, $TiO_2-ZnO_2$, $PbO-TiO_2$, $CoO-SnO_2$, $MgO-Al_2O_3$, $ZrO_2-SiO_2$, $CoO-Al_2O_3-MgO$, $CoO-Al_2O_3-Cr_2O_3$, $CoO-ZnO_2-MgO$, $Pb_3O_4-Sb_2O_3-TiO_2$, $Cr_2O_3-Sb_2O_3-TiO_2$, $Cr_2O_3-CuO-MnO_2$, $CoO-Cr_2O_3-Fe_2O_3$, $CoO-ZnO_2-NiO_2-TiO_2$ and $CoO-Cr_2O_3-MnO_2-Fe_2O_3$.

The nitride comprises BN, TiN, $Si_3N_4$, AlN and VN.

The carbide comprises SiC, TiC, WC, ZrC and VC, and the fluoride comprises $CaF_2$, $PbF_2$, $NaF_2$, $BaF_2$ and $MgF_2$.

Preferably the hard particles can be 0.05 to 15 µm order in size desirably 0.1 to 10 µm, in order to disperse them in the thin coating layer.

In the case where the coating layer comprises less than 1 wt % of the hard particles, the bearing can not be improved in wear resistance. On the other hand, if the hard particles are more than 50 wt %, the coating layer is deteriorated in wear resistance. Thus, the amount of the hard particles in the coating layer is set to 1 to 50 wt %, preferably 5 to 40 wt % to enhance anti-seizure property of the inner surface of the bearing and wear resistance of the coating layer.

The total amount of solid lubricant and hard particles is set to not more than 90 wt %, since more than 90 wt % of them causes the coating layer to become brittle resulting in that it is liable to be stripped off.

The coating layer is provided to the inner surface of the housing or the outer surface of the backing metal, preferably with a thickness of 2 to 30 µm. On the other hand, if both of the inner surface of the housing and the outer surface of the backing metal are provided with the coating layers, respectively, the total thicknesses of the two coating layers is desirably 2 to 30 µm. If it is less than 2 µm, the coating layer can not have satisfactory wear resistance. On the other hand, if the thickness exceeds 30 µm, the coating layer(s) is liable to be stripped off. The thickness of the coating layer is therefore preferably from 5 to 20 µm in respect of durability.

PREFERRED EMBODIMENTS OF THE INVENTION

Figure 1:
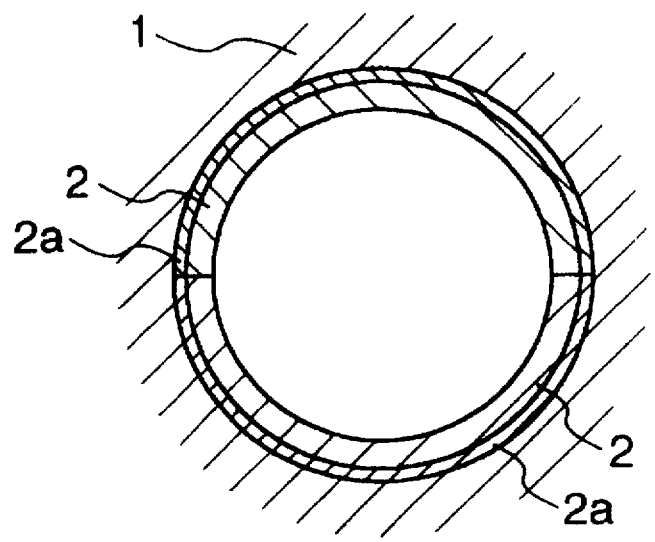
FIG. 1 schematically shows an embodiment of a bearing structure in which a sliding bearing is incorporated in a housing, only the outer surface of the bearing being covered with a coating layer.

Referring to the drawings, bearing structure according to the present invention are briefly described below before embodiments thereof.

FIG. 1 schematically shows a cylindrical bearing 2, consisting of bearing halves, which is incorporated in a housing 1. A coating layer 2a is provided on the outer surface of the bearing 2, which is in contact with the inner surface of the housing 1.

Figure 2:
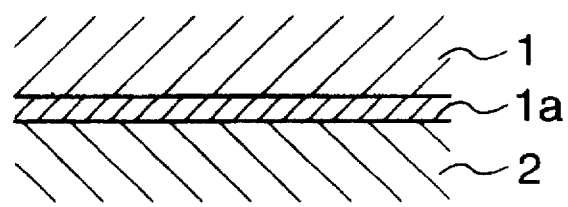
FIG. 2 schematically shows another embodiment of a bearing structure in which a sliding bearing is incorporated in a housing, only the inner surface of the housing being covered with a coating layer.
Figure 3:
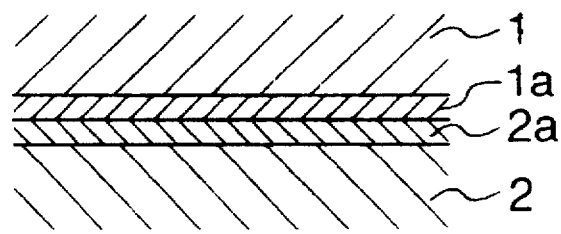
FIG. 3 schematically shows still another embodiment of a bearing structure in which a sliding bearing is incorporated in a housing, both the outer surface of the bearing and the inner surface of the housing being covered with coating layers.

Respective FIGS. 2 and 3 shows an essential part of another bearing structure which is generally same as that of FIG. 1. In FIG. 2, the outer surface of the bearing 2 is not coated, but only the inner surface of the housing 1 is provided with a coating layer 1a. In FIG. 3, the outer surface of the bearing 2 and the inner surface of the housing 1 are provided with coating layers 2a and 1a, respectively, and the bearing and the housing is in contact with each other through the coating layers 2a and 1a.

Embodiments of the invention are described in detail below.

Example:

A sliding bearing was tested, which was incorporated in the big end of a connecting rod for automotive engines to rotatably support a crank shaft. The sliding bearing was composed of two half-circular bearings (or bearing halves). By sintering, a bearing layer of Cu-3.5 wt % Sn-23 wt % Pb bearing alloy was formed on a backing metal with a thickness of 0.3 mm of a cold-rolled plate. The bearing material was cut and bent to a half-circular shape to obtain a sliding bearing half having an inner diameter of 42 mm, an outer diameter of 45 mm, and a width of 17 mm. An overlay of Pb-10 wt % Sn-3 wt % Cu alloy having a thickness of 15 mm was formed by plating on the bearing alloy layer. The outer surface of the backing metal was coated with resin having a composition shown in Tables 1 and 2, and the resin was cured to form a coating layer having a thickness of 15 µm.

The connecting rods used in the test, which were made of steel by forging, had a big end having an inner diameter of 45 mm. For invention examples Nos. 18 and 19 and comparative examples Nos. 6 and 7, coating layers having a composition in Tables 1 and 2 were formed on the inner surface of the big end of the connecting rod. For invention example No. 20 and comparative example No. 8, coating layers were formed on the outer surface of the backing metal and the inner surface of the connecting rod. For comparative example No. 9, no coating layer was formed.

The PAI, PTFE, and graphite used in the test were AI-10 (trade name) from Amoco, L-5 (trade name) from Daikin Kogyo Co., Ltd., and AOP (particle size: 2.5 µm) from Nihon Kokuen Kogyo Co., Ltd.

The molybdenum disulfide and zinc oxide used were Moripowder PS (trade name) (particle size: 0.4 µm) from Sumitomo Lubricant Co., Ltd. and Panatetra (trade name) (particle size: 8 µm) from Matsushita Amtech Co., Ltd.

The alumina (particle size: 3 µm) and $CoO-Al_2O_3$ (particle size: 0.4 µm) used in the test were from Nikkei Kako Kogyo Co., Ltd. and Asahi Chemical Industry Co., Ltd., respectively.

The $Si_3N_4$ (particle size: 0.6 µm) and SiC (particle size: 0.6 µm) used were from Shin-Etsu Chemical Co., Ltd., and $CaF_2$ (particle size: 7 µm) used were from Junsei Kagaku Co., Ltd., respectively.

TABLE 1

| No. | PAI | PTFE | Gr | MoS₂ | ZnO | Al₂O₃ | CoO—Al₂O₃ | Si₃N₄ | SiC | CaF₂ | COATED PART |
|---|---|---|---|---|---|---|---|---|---|---|---|
| INVENTION EXAMPLE | | | | | | | | | | | |
| 1 | Bal. | 20 | | 15 | | | | | | | OUTER SURFACE OF BEARING |
| 2 | Bal. | 20 | | | 15 | | | | | | " |
| 3 | Bal. | 20 | | | | 15 | | | | | " |
| 4 | Bal. | 20 | | | | | 15 | | | | " |
| 5 | Bal. | 20 | | | | | | 15 | | | " |
| 6 | Bal. | 20 | | | | 1 | | | | | " |
| 7 | Bal. | 20 | | | | 10 | | | | | " |
| 8 | Bal. | 20 | | | | 15 | | | | | " |
| 9 | Bal. | 20 | | | | 30 | | | | | " |
| 10 | Bal. | 20 | | | | 50 | | | | | " |
| 11 | Bal. | 5 | | | | 15 | | | | | " |
| 12 | Bal. | 30 | | | | 15 | | | | | " |
| 13 | Bal. | | 20 | | 15 | | | | | | " |
| 14 | Bal. | 5 | | 15 | | 15 | | | | | " |
| 15 | Bal. | 20 | 10 | | | 15 | | | | | " |
| 16 | Bal. | 5 | 20 | 15 | | 15 | | | | | " |
| 17 | Bal. | 5 | 20 | 15 | | 50 | | | | | " |
| 18 | Bal. | 20 | | | 15 | | | | | | INNER SURFACE OF ROD |
| 19 | Bal. | 5 | 20 | 15 | | 15 | | | | | " |
| 20 | Bal. | | 20 | | 15 | | | | | | BOTH SURFACES |

TABLE 2

| No. | PAI | PTFE | Gr | MoS₂ | ZnO | Al₂O₃ | CoO—Al₂O₃ | Si₃N₄ | SiC | CaF₂ | COATED PART |
|---|---|---|---|---|---|---|---|---|---|---|---|
| COMPARATIVE EXAMPLE | | | | | | | | | | | |
| 1 | Bal. | 20 | | | | | | | | | OUTER SURFACE OF BEARING |
| 2 | Bal. | | | 20 | | | | | | | " |
| 3 | Bal. | 5 | | 15 | | | | | | | " |
| 4 | Bal. | 20 | 10 | | | | | | | | " |
| 5 | Bal. | 5 | 20 | 15 | | | | | | | " |
| 6 | Bal. | 20 | | | | | | | | | INNER SURFACE OF ROD |
| 7 | Bal. | 5 | 20 | 15 | | | | | | | " |
| 8 | Bal. | | | 20 | | | | | | | BOTH SURFACES |
| 9 | NO COATING LAYER | | | | | | | | | | |

Using a vibration test machine, fretting tests were performed on the invention examples and comparative examples under the conditions in Table 3.

TABLE 3

| FRETTING TEST CONDITIONS | | UNIT |
|---|---|---|
| BEARING DIMENSIONS | 45(ID) × 17(W) × 1.5(T) | mm |
| FREQUENCY | 60 | Hz |
| NUMBER OF CYCLES | 2 × 10⁶ | CYCLES |
| CONNECTING ROD MATERIAL | FORGED STEEL | — |

*Note:
ID = Inner Diameter, W = Width, T = Thickness

As shown in Tables 4 and 5, in the tests, only comparative example No. 9 with no coating layer was found to be damaged due to fretting, while the invention examples and other comparative examples were not.

TABLE 5

| No. | | SEIZURE TEST | | | | FRETTING TEST | WEAR TEST |
|---|---|---|---|---|---|---|---|
| | | SEIZURE LOAD (MPa) | | | | DAMAGE DUE TO FRETTING | WEAR AMOUNT (μm) |
| | | 60 | 70 | 80 | 90 | | |
| Comparative Example | 1 | → | | | | UNDAMAGED | 15 |
| | 2 | → | | | | " | 14 |
| | 3 | → | | | | " | 15 |
| | 4 | —→ | | | | " | 18 |
| | 5 | ——→ | | | | " | 20 |
| | 6 | →  | | | | " | 15 |
| | 7 | —→ | | | | " | 20 |
| | 8 | → | | | | " | 14 |
| | 9 | —————————→ | | | | Damaged | Scoring |

A seizure test was performed under the conditions in Table 6. Tables 4 and 5 give the results.

TABLE 6

| SEIZURE TEST CONDITIONS | | UNIT |
|---|---|---|
| BEARING DIMENSIONS | 45(ID) × 17(W) × 1.5(T) | mm |
| PERIPHERAL VELOCITY | 20 | m/sec |
| LUBRICANT OIL | SAE #10 | — |

| TEST METHOD |
|---|
| ACCUMULATIVE LOADING: LOAD IS INCREASED BY 50 MPa EVERY TEN MINUTES |

*Note:
ID = Inner Diameter, W = Width, T = Thickness

According to example No. 1 and invention examples No. 6 to 10 in the seizure test, all of which coating layers contain 20 wt % of PTFE, the higher amount of the composite oxide (CoO-Al$_2$O$_3$) is, the higher level of seizure load is. For invention examples No. 10, 15 to 17, the seizure load was 85 MPa, so that invention examples No. 10, 15 to 17 were found to have the same anti-seizure property as comparative example No. 9 with no coating layer.

The wear amount of coating layers with a composition in Tables 1 and 2 was measured under the conditions in Table 7, using a Suzuki wear tester. In the measurements, a pin made of low-carbon steel was rubbed against rectangular test pieces with a coating layer 15 μm thick deposited thereon. For invention examples No. 18 and 19 and comparative examples No. 6 and 7, a pin was used which was covered with a coating layer having a composition in Table 1 or 2.

TABLE 7

| CONDITIONS OF WEAR TEST | | UNIT |
|---|---|---|
| BEARING DIMENSIONS | 27.2(OD) × 22(ID) | mm |
| SPECIFIC LOAD | 15 | MPa |
| PERIPHERAL VELOCITY | 0.01 | m/sec |

TABLE 7-continued

| CONDITIONS OF WEAR TEST | | UNIT |
|---|---|---|
| LUBRICANT | VG22 | — |
| TIME OF TEST | 4 | Hr |

*Note:
OD = Outer Diameter, ID = Inner Diameter

Tables 4 and 5 show the wear measurements obtained. According to comparative example No. 1 and invention examples 6 to 10 in the wear test, all of which coating layers contain 20 wt % of PTFE, the higher amount of the composite oxide (CoO-Al$_2$O$_3$) is, the less amount of wear is. For comparative example No. 9 with no coating layer, scoring occurred.

As will be apparent from the above, according to the invention, providing on at least one of the outer surface of a sliding bearing and the inner surface of a housing a coating layer which is composed of 3 to 50 wt % solid lubricant, 1 to 50 wt % hard particles, and the balance of polyamide-imide resin, the total amount of solid lubricant and hard particle contents being 90 wt % or less provides a bearing structure in which the outer surface of a sliding bearing is highly resistant to fretting and wear.

What is claimed is:

1. A bearing structure of a sliding bearing which is held in a housing and which rotatably supports a rotary shaft, wherein at least one of the outer surface of said sliding bearing and the inner surface of said housing is covered with a coating layer which essentially consists of, by weight, a total amount of not more than 90% of solid lubricant and hard particles wherein the solid lubricant is of 3 to 50% and the hard particles are of 1 to 50%, and the balance of polyamide-imide resin.

2. A bearing structure according to claim 1, wherein said hard particles consist of at least one selected from the group consisting of oxide, nitride, carbide and fluoride.

3. A bearing structure according to claim 2, wherein said oxide consists of at least one selected from the group consisting of a metal oxide and a composite metal oxide.

4. A bearing structure according to claim 1, wherein said solid lubricant consists of at least one selected from the group consisting of polytetrafluoroethylene, molybdenum disulfide (MoS2) and graphite.

5. A sliding bearing whose outer surface is covered with a coating layer which essentially consists of, by weight, a total amount of not more than 90% of solid lubricant and hard particles wherein the solid lubricant is of 3 to 50% and the hard particles are of 1 to 50%, and the balance of polyamide-imide resin.

* * * * *